3,254,091
3-CYANO-3-(N-PIPERIDINO)-PROPIOTHIOAMIDE
Fred W. Starks, Buffalo, N.Y., assignor to The Samuel Roberts Noble Foundation Incorporated, Ardmore, Okla., a corporation of Oklahoma
No Drawing. Filed Apr. 2, 1963, Ser. No. 269,897
1 Claim. (Cl. 260—293.4)

This invention relates to novel amide derivatives and to processes of producing same.

This application is a continuation-in-part application to my copending application Ser. No. 56,100, filed September 15, 1960, now abandoned.

In carrying out my invention I first produce a novel intermediate piperidine derivative which may then be reacted in a manner to be described to produce the final compound of this invention.

According to my invention, I initially produce the compound α-piperidinosuccinonitrile which has the structural formula:

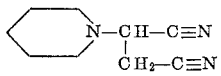

by reacting fumaronitrile with piperidine in the presence of an organic solvent such as benzene, methanol, ethanol, etc.

This reaction may be illustrated by the following equation

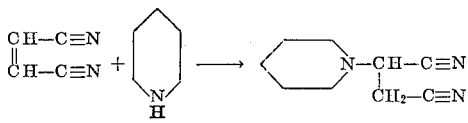

In carrying out the reaction the reactants are preferably employed in stoichiometric quantities and the temperature of the reaction is preferably maintained at about room temperature, by means of external cooling, although the temperature may be lower. After the reaction has subsided the reactants are stored at room temperature, preferably overnight. The solvent is then removed under vacuum and the crystalline residue recrystallized from an ethanol-water mixture. Extreme care must be exercised during the recrystallization since hydrogen cyanide is liberated when the compound is dissolved in methanol or ethanol.

The α-piperidinosuccinonitrile thus produced may then be employed as an intermediate in the production of the final compound of this invention. In this embodiment of my invention α-piperidinosuccinonitrile is reacted with hydrogen sulfide gas in the presence of a compound such as ethanolamine or diethanolamine to produce piperidino-cyano-propiothioamide which is believed to have the structural formula:

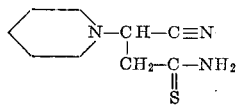

This reaction may be illustrated by the following equation:

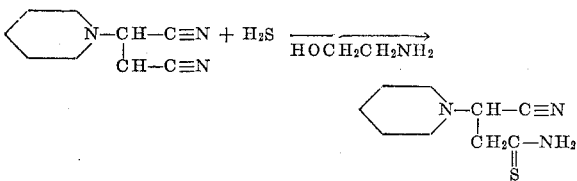

In carrying out the reaction α-piperidinosuccinonitrile and ethanolamine or diethanolamine are added to a minimum of solvent. I prefer to employ ethanol as the solvent although methanol, acetone, dioxane, ethyl acetate, etc., may also be used. Hydrogen sulfide gas is then bubbled through the reaction medium for about 1–2 hours while the reaction temperature is maintained at 25° C. or below by means of external cooling. The reaction solution is stored at room temperature for several hours, about 4–24 hours, to allow for the completion of the reaction. About 50% of the solvent is then removed under vacuum and the product recovered by crystallization.

The compounds of this invention are effective as intermediates in organic reactions and in the agricultural field for such uses as bactericides, insecticides, miticides, fungicides, defoliants and for seed sterilization.

The following examples are illustrative only of my invention and I intend to be bound only by the spirit and scope of the appended claims:

Example I.—Synthesis of α-piperidinosuccinonitrile

To 200 ml. of benzene were added 0.51 mole of fumaronitrile and 0.59 mole of piperidine. The solution was maintained at room temperature by external cooling. After the reaction had subsided, the solution was stored at room temperature overnight. The solvent was then removed under vacuum. The crystalline residue was recrystallized from an ethanol-water mixture. Yield, 67 g. Melting point 86–87° C. uncorrected.

Theoretical molecular weight=163. Experimental molecular weight=168.

Infrared spectrum was characteristic of the nitrile functional group. All other functional groups of other reaction courses were absent.

Example II.—Synthesis of piperidino-cyanopropiothioamide

To a minimum amount of ethanol were added 0.11 mole of α-piperidinosuccinonitrile and 0.22 mole of ethanolamine. Hydrogen sulfide gas was bubbled through the solution for 105 minutes. During this time the solution was maintained at a temperature of 25° C. or below by external cooling. The solution was then stored at room temperature for 4–24 hours to permit the reaction of the components. At the end of this period approximately 50% of the solvent was removed under vacuum. The reaction product was recovered by adding water in small increments to initiate crystallization, then in large excess. The white, crystalline material was quickly filtered and air dried. Yield was 6.5 grams. The melting point of the product varied from 95–96° C. to 110–113° depending on rate of heating the sample and purity. The material slowly darkens to a pink color on standing.

Analyses.—Calculated for $C_9H_{15}N_3S$: C 54.9, H 7.63, N 21.3, S 16.3. Analyzed: C 53.42, H 7.64, N 21.11, S 16.28.

Having thus provided a written description of the present invention and provided specific examples thereof, it should be understood that no undue restrictions or limitations are to be imposed by reason thereof but that the present invention is defined by the appended claim.

I claim:

The compound 3-cyano-3-(N-piperidino)-propiothioamide.

References Cited by the Examiner
UNITED STATES PATENTS
3,073,833   1/1963   Starks _____ 260—293.46

WALTER A. MODANCE, Primary Examiner.
JOHN D. RANDOLPH, Examiner.
ROBERT L. PRICE, A. D. SPEVACK,
Assistant Examiners.